Patented Apr. 29, 1941

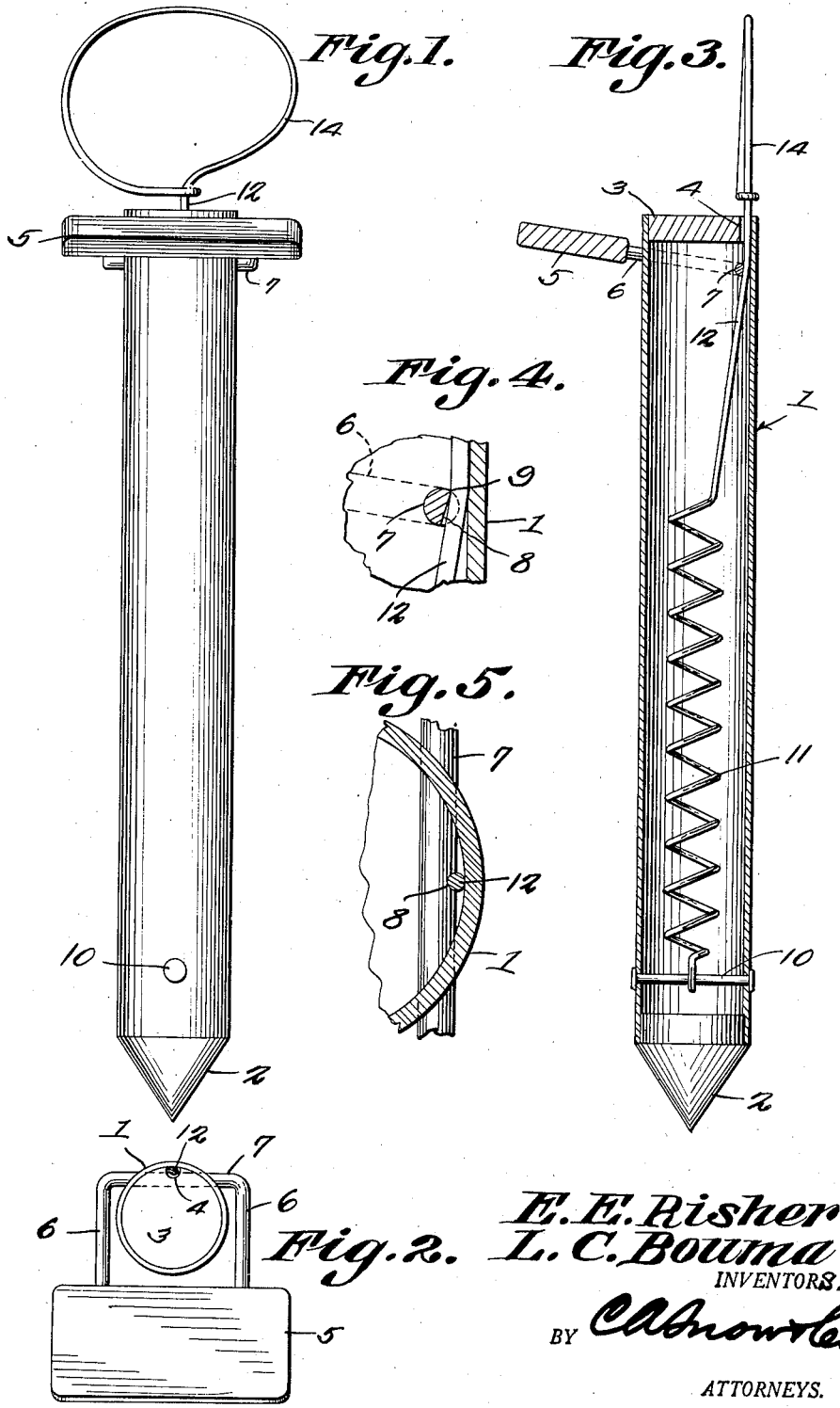

2,240,418

UNITED STATES PATENT OFFICE 2,240,418

ANIMAL TRAP

Elmer E. Risher and Louis C. Bouma, Lynville, Iowa

Application November 4, 1940, Serial No. 364,290

3 Claims. (Cl. 43—87)

The device forming the subject matter of this application is an animal trap, of that general type in which a noose is tightened around the head or body of an animal.

The invention aims to provide novel means for mounting and operating the noose, and to provide a trap which does not call for chains, stakes and the like, in order to secure it in place.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows, in side elevation, an animal trap constructed in accordance with the invention;

Fig. 2 is a top plan;

Fig. 3 is a longitudinal section;

Fig. 4 is a longitudinal sectional detail, enlarged from Fig. 3;

Fig. 5 is a transverse section, wherein parts are broken away.

In carrying out the invention, there is provided a body 1, in the form of a tubular stake, provided at its lower end with a pointed, earth-entering foot 2, which is securely fixed in the body 1. A substantial closure or anvil 3 is fixed in the upper end of the body 1 and is strong enough to withstand the blows of a maul or other driving tool.

It may here be noted that the stake 1 can be driven into the ground any desired distance. The stake 1 not only carries the working portions of the trap, but, also, constitutes a means for anchoring the trap in the soil, and, consequently, it is unnecessary to provide chains, pegs and the like, for holding the trap in place, the trapper's load being decreased accordingly. There is an opening 4 in the closure 3, the opening being located close to the inner surface of the stake 1.

The numeral 5 marks a laterally extended tread plate, disposed near the top of the stake 1. The tread plate 5 has arms 6 which span the body 1, the arms being joined together by a pivot element 7, mounted to rotate in the body 1, close to the inner surface of the body, the pivot element being provided with a notch or seat 8, which opens against the inner surface of the stake 1, the notch or seat 8 defining an upper gripping edge 9 in the pivot element 7.

An anchor 10, such as a rivet, is mounted in the lower part of the body 1. A retractile spring 11 is disposed in the tubular stake 1, the lower end of the retractile spring being secured to the anchor 10. The spring 11 is provided at its upper end with a flexible finger 12, which passes through the seat 8 in the pivot element 7 of the tread plate 5 and through the opening 4 in the closure 3. The upper part of the finger 12 is formed into a sliding noose 14.

In practical operation, the noose 14 is pulled upwardly and enlarged in size, the spring 11 being put under strong tension. The tread plate 5 is swung upwardly, until the gripping edge 9 of the pivot element 7 binds the finger 12 of the spring 11 against the inner surface of the stake 1, the noose 14 being held in enlarged condition, and the tread plate 5 being disposed in an upwardly inclined position.

The animal thrusts his head or body through the enlarged noose 14, and steps on the tread plate 5, the tread plate being swung downwardly and the hold of the gripping edge 9 of the pivot element 7 on the finger 12 of the noose 14 being released. The spring 11 reacts to draw the finger 12 downwardly, the noose 14 being reduced in size, by contact with the closure 3. The noose 14 is tightened about the head of the body of the animal, and the animal is held securely.

It is to be noted that the possibility that an animal will be caught by a leg, is reduced to a minimum, it being a matter of common knowledge that an entrapped animal often will chew off a leg, in order to escape. As has been intimated hereinbefore, all working parts are carried by a driving stake, it being unnecessary to supply tethering chains, anchor pegs and the like, the trapper's load being decreased accordingly. All parts, preferably, are fashioned from metal.

Having thus described the invention, what is claimed is:

1. In an animal trap, a rigid, tubular stake, capable of being driven into the ground, an anvil assembled with the upper end of the stake, a slip noose at the upper end of the stake, and offset laterally to expose the anvil for the reception of blows, resilient means housed within the stake for reducing the size of the noose to animal-holding dimensions, and tread actuated means carried by the stake and cooperating with the resilient means to hold the noose releasably against the aforesaid size reduction.

2. In an animal trap, a rigid tubular stake capable of being driven into the ground, and provided at its upper end with a closure having a reduced opening, a retractile spring in the stake and having its lower end anchored to the stake, the upper end of the spring merging into a finger extended upwardly through the opening, the upper portion of the finger being formed into a slip noose reducible in size by contact with the closure, and a tread plate including a pivot element mounted in the stake and disposed close to the inner surface of the plate, the pivot element being provided with a seat which receives the finger slidably, the seat defining a gripping edge cooperating with the finger to bind the finger against the inner surface of the stake and hold the trap set.

3. In an animal trap, a rigid tubular stake capable of being driven into the ground, and provided at its upper end with a closure having a reduced opening, a retractile spring in the stake and having its lower end anchored to the stake, the upper end of the spring merging into a finger extended upwardly through the opening, the upper portion of the finger being formed into a slip noose, reducible in size by contact with the closure, and a tread plate including a pivot element mounted in the stake, the pivot element being provided with a seat which receives the finger slidably, the seat defining a gripping edge cooperating with the finger and aiding in holding the trap set.

ELMER E. RISHER.
LOUIS C. BOUMA.